United States Patent
Burgess

(10) Patent No.: US 10,208,888 B1
(45) Date of Patent: Feb. 19, 2019

(54) ERGONOMIC TABLET HOLDER

(71) Applicant: Facebook, Inc., Menlo Park, CA (US)

(72) Inventor: Kirk Erik Burgess, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/705,213

(22) Filed: Sep. 14, 2017

(51) Int. Cl.
| F16M 11/20 | (2006.01) |
| F16M 11/04 | (2006.01) |
| G06F 1/16  | (2006.01) |
| F16M 11/22 | (2006.01) |

(52) U.S. Cl.
CPC ......... *F16M 11/2021* (2013.01); *F16M 11/04* (2013.01); *F16M 11/22* (2013.01); *G06F 1/1654* (2013.01); *F16M 2200/045* (2013.01)

(58) Field of Classification Search
CPC .... F16M 11/2021; F16M 11/04; F16M 11/22; F16M 2200/045; F16M 11/2035; G06F 1/1654
USPC ........ 248/550, 162.1, 371, 454–457, 123.11, 248/292.11, 297.11; 108/1, 2, 3, 8, 37
See application file for complete search history.

(56) References Cited

U.S. PATENT DOCUMENTS

| 321,425 A * | 7/1885 | Dyar ...................... A47B 19/06 248/185.1 |
| 2,539,700 A * | 1/1951 | Pieper .................... A47B 27/18 108/2 |
| 3,795,566 A * | 3/1974 | Epley .................... B29C 63/024 156/538 |
| 4,154,173 A * | 5/1979 | Chesnut ................. A47B 27/00 108/6 |
| 5,033,705 A * | 7/1991 | Reagan ................. B66F 11/048 182/2.8 |
| 5,098,049 A * | 3/1992 | van Vlaardingen .. B66F 11/048 182/19 |
| 5,213,293 A * | 5/1993 | Muentener ............. F16M 11/10 248/123.11 |
| 6,273,585 B1 * | 8/2001 | Wu ........................ F21V 21/30 362/135 |
| 7,744,047 B2 * | 6/2010 | Thorn ...................... G10G 5/00 248/176.3 |
| 7,787,242 B2 * | 8/2010 | Schwager ............... G06F 1/162 361/679.06 |
| 8,356,908 B1 * | 1/2013 | Zadro .................... A45D 42/10 362/135 |
| 8,572,830 B2 * | 11/2013 | Tolentino .............. H01F 7/0252 148/101 |

(Continued)

*Primary Examiner* — Nkeisha Smith
(74) *Attorney, Agent, or Firm* — FisherBroyles, LLP

(57) ABSTRACT

An adjustable holder assembly is disclosed that has a mounting structure and a display support with a center of gravity and being rotatably coupled to the mounting structure for rotation about an axis of rotation. The display support has a support structure and an adjustable counterweight assembly with a counterweight and an adjustment mechanism connected to the counterweight. The counterweight is spaced apart from display support's axis of rotation. The adjustment mechanism is adjustable to move the counterweight in a direction normal to the axis of rotation to move the center of gravity toward or away from the support structure. The adjustable counterweight is configured to provide a force feedback to a user pressing on an input portion of the computer tablet by moving the center of gravity toward or away from the support structure.

20 Claims, 6 Drawing Sheets

(56) References Cited

U.S. PATENT DOCUMENTS

| | | | |
|---|---|---|---|
| 9,406,248 B2* | 8/2016 | Dalton | G09F 7/22 |
| 9,717,351 B2* | 8/2017 | Law | F16M 11/041 |
| 9,878,645 B2* | 1/2018 | Kim | B60N 2/4864 |
| 2007/0058331 A1* | 3/2007 | Schwager | G06F 1/162 |
| | | | 361/679.27 |
| 2016/0117960 A1* | 4/2016 | Dalton | G09F 7/22 |
| | | | 248/595 |

* cited by examiner

ERGONOMIC TABLET HOLDER

TECHNICAL FIELD

This patent application is directed to computer device holders, and more specifically to adjustable, ergonomic holders for tablets, laptops, monitors, and other computer or display devices.

BACKGROUND

Computer tablets, laptop computers, monitors, and other computer devices are often used by multiple users, such as computer stations in corporate, industrial, or retail environments. The devices are typically oriented so the user can type or press on controls, such as keys, buttons, switches, or other user input portions of the device. For example, a tablet with a touch-screen can be supported so that one of multiple users can use the device by typing or pressing on the display screen to input or access data. When the tablet is lying flat on a station, the orientation of the keyboard may not be very ergonomically comfortable or efficient for the user. In addition, each user typically has a unique typing pressure, which is the force with which the user presses on the tablet's display. If the tablet is retained on a movable mounting feature that holds the tablet at a tipped angle, the mounting feature must be able to resist the user's typing pressure to avoid inadvertently moving the tablet during use. Alternatively, the user must change his or her typing pressure to prevent the tablet from unintentionally moving while using the device.

BRIEF DESCRIPTION OF THE DRAWINGS

Embodiments of the ergonomic holder assembly disclosed herein may be better understood by referring to the following Detailed Description in conjunction with the accompanying drawings, in which like reference numerals indicate identical or functionally similar elements.

Figure 1:
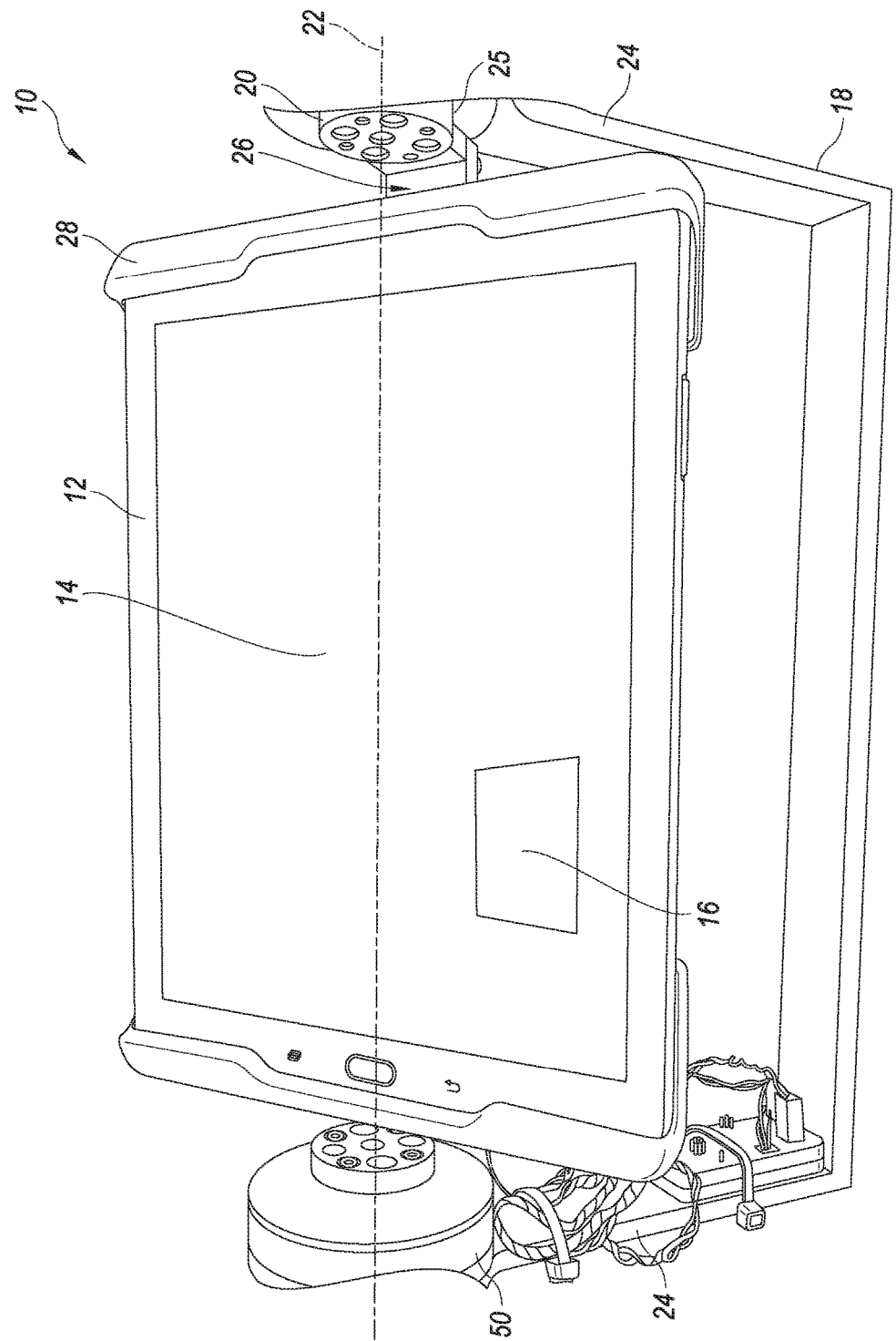
FIG. 1 is an isometric view of an adjustable, ergonomic device holder assembly in accordance with an embodiment of the present disclosure.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

An adjustable holder assembly for use with a computer device, such as a tablet, laptop, monitor, keypad, display, or other computer device. The holder assembly has a display support that supports a selected device with a user interface portion, such as a tablet The display support is rotatable with the tablet as a unit to adjust the angular, ergonomic orientation of the tablet for the user. An adjustable counterweight assembly is connected to the support structure and is configured to move the center of gravity of the assembly toward or away from the tablet, so as to increase or decrease the force feedback provided to a user when typing or otherwise pressing on the tablet.

In an embodiment, an adjustable holder assembly is provided for use with a computer device that has a user interface portion. The holder assembly has a mounting structure and a display support rotatably coupled to the mounting structure for rotation about an axis of rotation. The display support has a center of gravity and has a support structure connectable to the computer device, wherein the display support and the computer device are rotatable as a unit about the axis of rotation in response to a user pressing against an input portion of the computer device at a location spaced apart from the axis of rotation. An adjustable counterweight assembly is connected to the support structure and has a counterweight and an adjustment mechanism connected to the counterweight. The counterweight is spaced apart from the axis of rotation, and the adjustment mechanism is adjustable to move the counterweight in a direction normal to the axis of rotation to move the center of gravity toward or away from the support structure in a direction substantially parallel to an axis normal to the computer device. The adjustable counterweight is configured to cause a force feedback provided to a user pressing on the input portion of the computer device. Adjusting the counterweight to move the center of gravity toward the support structure decreases the force feedback, and adjusting the counterweight to move the center of gravity away from the support structure increases the force feedback.

Another embodiment provides an adjustable holder assembly that has orthogonally oriented first, second and third axes, wherein the first and second axis are substantially parallel to a display of a computer tablet, and the third axis is substantially perpendicular to the display. The holder assembly comprises a mounting structure and a tablet support rotatably coupled to the mounting structure for rotation about an axis of rotation. The tablet support has a center of gravity and comprises a support structure configured to removably retain the computer tablet with the first axis substantially coincident with the axis of rotation. The tablet support structure and computer tablet are rotatable as a unit about the axis of rotation and relative to the mounting structure in response to a user applying a force to the display at or adjacent to the user interface portion at a location spaced apart from the axis of rotation. An adjustable counterweight assembly connected to the support structure has a counterweight and an adjustment mechanism. The adjustment mechanism is substantially aligned with the third axis and is connected to the counterweight. The adjustment mechanism is adjustable to move the counterweight relative to the support structure and to move the center of gravity substantially parallel to the third axis toward or away from the support structure. Adjusting the counterweight to move the center of gravity toward the support structure decreases resistance of the tablet support to rotate about the axis of rotation, and thereby providing a force feedback to a user pressing on the user interface at a location spaced apart from axis of rotation and in a direction substantially parallel to the third axis.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. The terminology used below is to be interpreted in its broadest reasonable manner, even though it is being used in conjunction with a detailed description of some specific examples of the embodiments.

FIG. 1 is an isometric view of an adjustable, ergonomic holder assembly 10 in accordance with an embodiment of the present disclosure. The holder assembly 10 of the illustrated embodiment securely holds a computer tablet 12 in an adjustable orientation that allows a user to see the tablet's display 14 and to type or otherwise interact with the tablet's controls 16 on or adjacent to the display 14. The controls can be, for example, a keyboard, icons, keys, buttons, or other data input features on a touch-sensitive display 14. The holder assembly 10 allows the tablet 12 to rotate and change the tablet's angular orientation so the user can see and interact with the display 14 and the controls 16 in an ergonomically comfortable and effective manner. For example, when the user begins to type on the tablet's keyboard, the user's fingers and hands press on the controls 16 displayed on a portion of the tablet's display area. The holder assembly 10 can allow the tablet 12 to rotate to a comfortable position for the user's hands during use.

As discussed in greater detail below, the holder assembly 10 has an adjustable counterweight assembly that provides selected resistance to rotation of the tablet 12 and the holder assembly 10. This selected resistance provides force feedback to the user while typing on the tablet 12. The holder assembly 10 can be adjusted to increase or decrease the force feedback and the angular orientation of the tablet 12 while the user is typing or otherwise pressing on the tablet's controls 16. For example, a user who is a "heavy typer," because he or she presses hard against the device while typing, may prefer increased force feedback to counter the typing forces, while still allowing the tablet 12 to tip toward the user for easy viewing of the display 14. Other users may prefer a reduced force feedback, such that the counterweight assembly may be adjusted to decrease the force feedback for that user while interfacing with the tablet 12. While the holder assembly 10 of the illustrated embodiment is described herein in connection with the illustrated embodiment reference to a computer tablet 12, embodiments of the holder assembly 10 can also be used with laptop computers, smart phones, personal electronic devices, displays, or other user interaction devices.

The holder assembly 10 of the illustrated embodiment has a mounting frame 18 with a pair of spaced apart, fixed mounting arms 24 that can be coupled to a base or stand, such that the mounting frame 18 is stationary relative to a table, desk, platform, or other structure on which the holder assembly 10 is placed. A tablet support 20 is pivotally connected to the mounting arms 24, such that the tablet support 20 can be pivoted relative to the mounting frame 18 about an axis of rotation 22. The tablet support 20 can be connected to the mounting arms 24 via one or more swivel bearings 25 or other interconnection that allows for movement about the axis of rotation 22.

Figure 2:
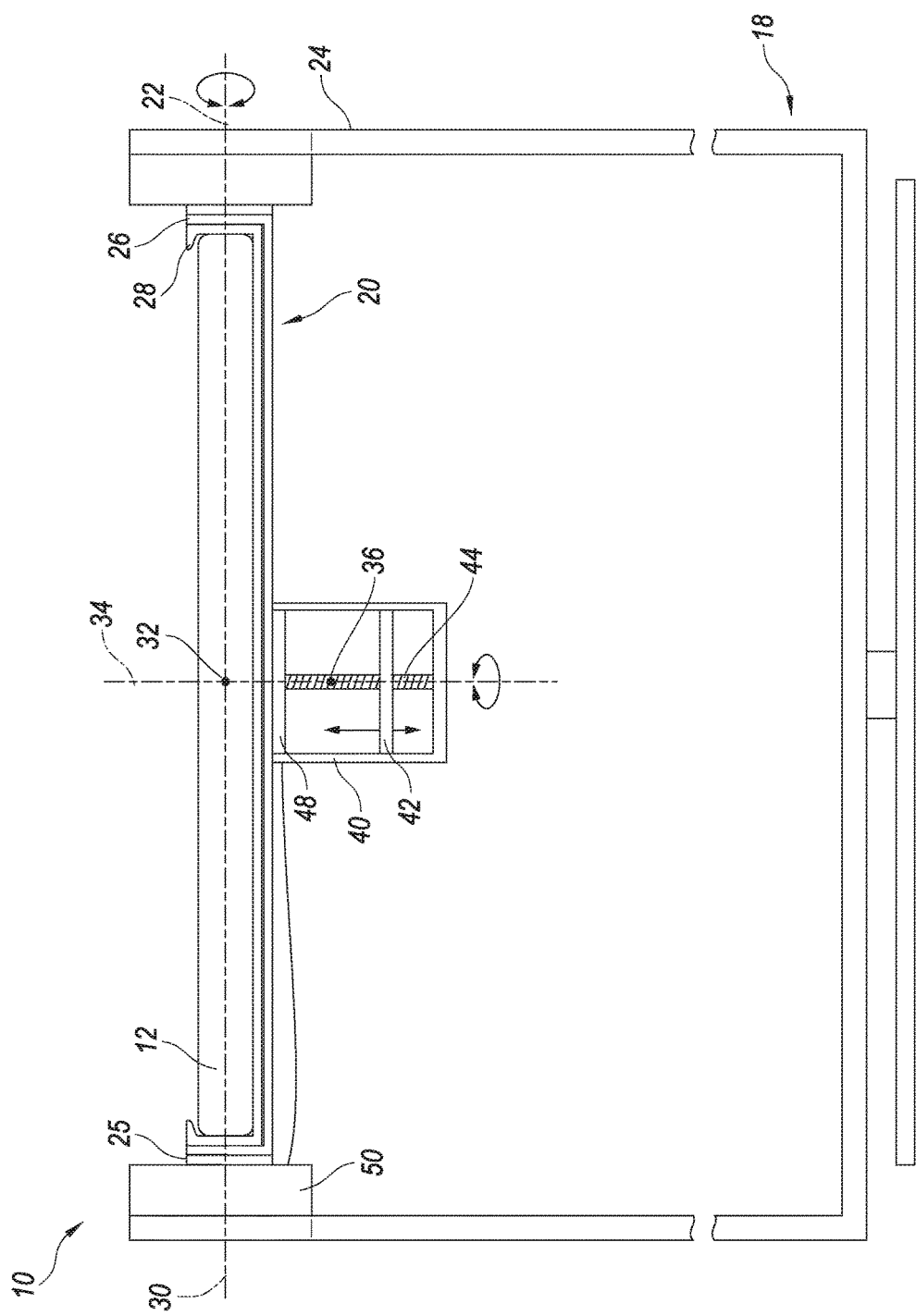
FIG. 2 is a front elevation view of the holder assembly of FIG. 1 with a computer tablet in a horizontal natural resting position.

As seen in FIGS. 1 and 2, the tablet support 20 has a support frame 26 connected to the mounting frame 18, and a retention frame 28 is affixed to the support frame 26. The retention frame 28 removably retains the tablet 12 in a fixed position on the support frame 26, such that the tablet 12 and the tablet support 20 rotate as a unit about the axis of rotation 22. The retention frame 28 is configured to support the tablet 12 so the retention frame's central axis (i.e., the longitudinal or lateral axis) is substantially parallel with the axis of rotation 22. In the illustrated embodiment, the retention frame 28 holds the tablet 12 so the tablet's central axis is substantially coincident with the axis of rotation 22. The tablet's planar display 14 with the controls 16 is also substantially parallel with the axis of rotation 22.

Figure 3:
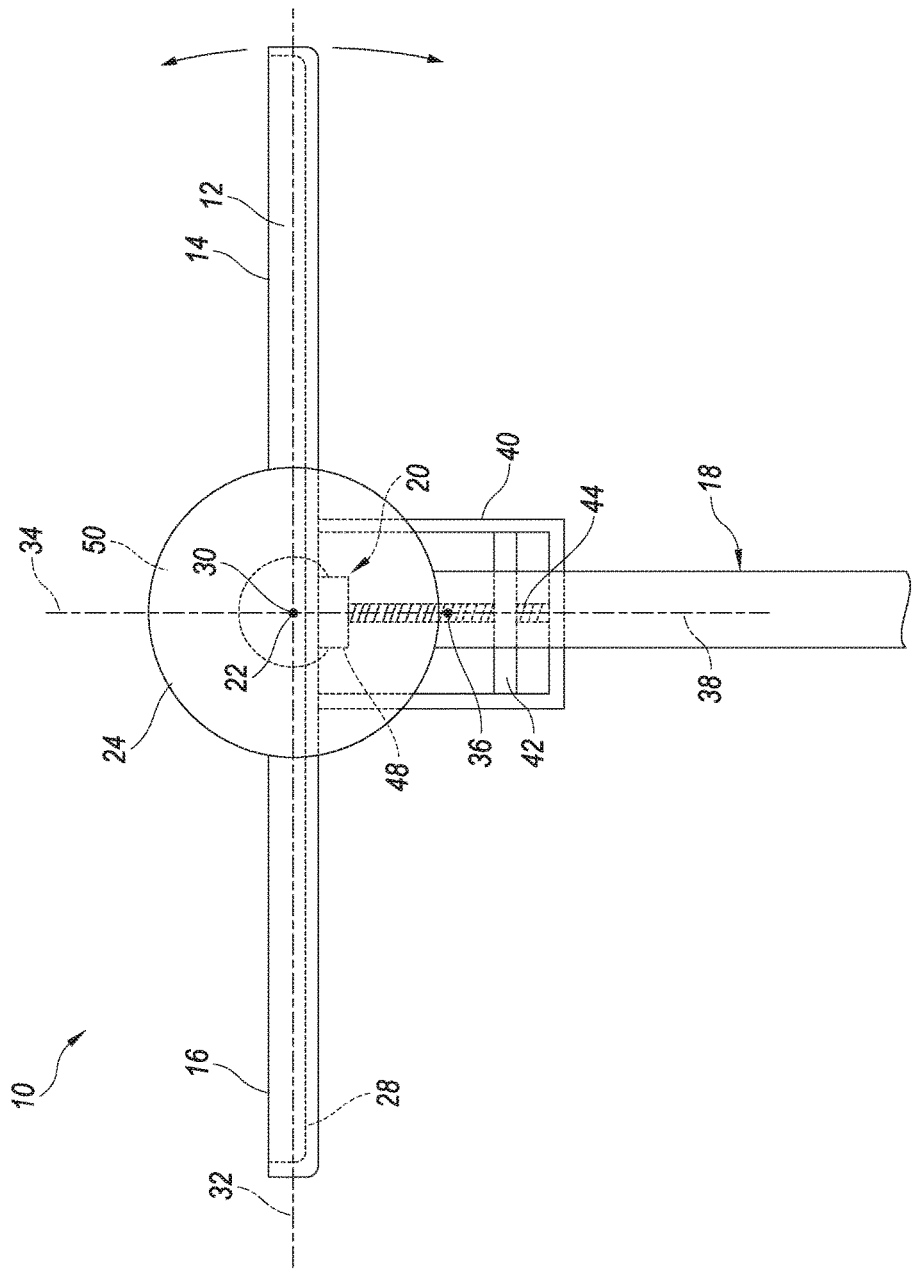
FIG. 3 is a partial side elevation view of the holder assembly of FIG. 2 with the tablet in the horizontal natural resting position.

FIGS. 2 and 3 are front and side elevation views of the tablet holder assembly 10 of FIG. 1 in a horizontal natural resting position in which the tablet 12 and the tablet support 20 are positioned with X and Y axes 30 and 32 substantially horizontally aligned and a Z axis 34 orthogonal to the X and Y axes 30 and 32. In the illustrated embodiment, the X axis 30 is substantially coincident with the axis of rotation 22. The tablet support's Z axis 34 is also substantially normal to tablet's display 14 and/or the controls 16. The tablet support 20 has a center of gravity 36 located substantially along the Z axis 34 and positioned below the axis of rotation 22.

The tablet support 20 has an adjustable counterweight assembly 40 connected to the support frame 26 below the tablet 12. The counterweight assembly 40 has one or more counterweights 42 attached to an adjustment mechanism 44 that can be adjusted to move the counterweight 42 substantially parallel to the Z axis 34 toward or away from the tablet 12 and the support frame 26. In the illustrated embodiment, the adjustment mechanism 44 is a screw drive with a worm screw threadably engaging the counterweight 42, such that rotation of the screw drive moves the counterweight 42 axially along the worm screw toward or away from the tablet 12. In other embodiments, the adjustment mechanism 44 can be a belt drive, a linear actuator, or other mechanism that adjusts the position of the counterweight 42 parallel to the Z axis 34 toward or away from the tablet 12. The adjustment mechanism 44 can be manually adjustable to move the counterweight 42 relative to the support frame 26. In other embodiments, the adjustment mechanism can be motorized, such as with a drive motor 48 that can be activated to drive the adjustment mechanism 44 and to move the counterweight 42, and thus the center of gravity 36, to a selected position relative to the tablet 12 and the support frame 26.

Figure 4:
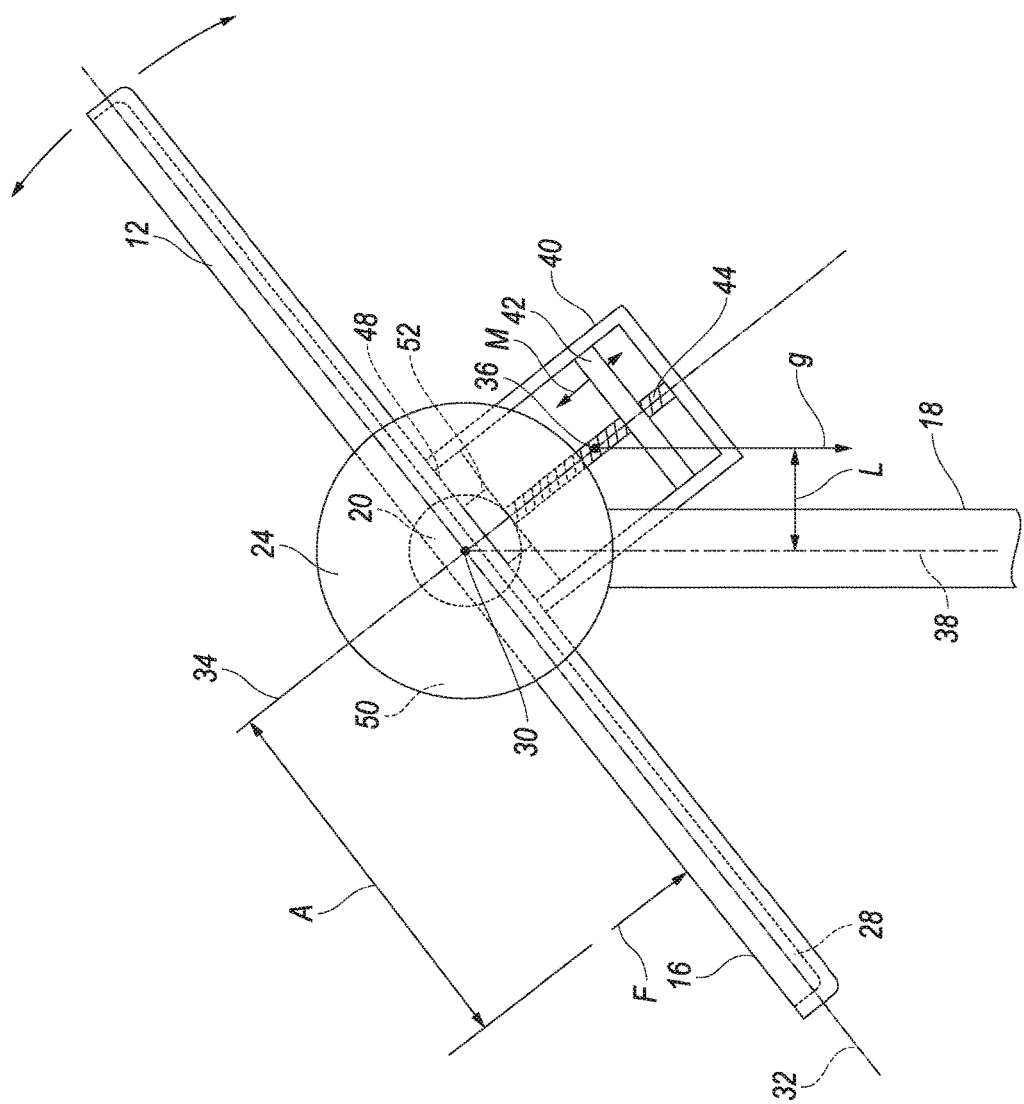
FIG. 4 is a partial side elevation view of the holder assembly of FIG. 1 with the tablet in a tilted, operating position.

FIG. 4 is a partial side elevation view of the tablet holder assembly 10 of FIG. 1 in a tilted, operating position wherein a user applies a force "F" to a portion of the tablet's top surface spaced apart from the axis of rotation 22. For example, when a user is typing on the tablet's keyboard, or is pressing icons or the like on a touch-sensitive display screen, the user's engagement with the tablet 12 applies the force F normal to the tablet's surface and normal to the X and Y axes 30 and 32. The rotational torque applied to the tablet support 20 and tablet 12 is a function of the force F and the distance "A" between the force F and from the axis of rotation 22 (i.e., the X axis 30). Accordingly, a user who is a "heavy typer" presses harder against the tablet 12 so as to apply a greater force to the tablet 12, resulting in a greater rotational torque applied to the tablet support 20.

The counterweight assembly 40 is configured to counteract the rotational torque and to provide a desired amount of force feedback to the user typing on the tablet 12. The counterweight assembly 40 has a mass "M," and when the counterweight 42 is moved farther away from the support frame 26 and the tablet 12 along or parallel to the Z axis 34, the center of gravity 36 also moves farther away from the support frame 26 and the tablet 12. As a result, the counterweight assembly 40 applies a larger torsional load that counteracts the rotational torque from the user typing on the tablet 12. This larger counteracting load also provides an increased force feedback to the user's fingers while typing. A smaller counteracting load, which is achieved by moving the counterweight 42 and the center of gravity 36 closer to the axis of rotation 20, provides a reduced force feedback.

When the tablet support 20 and the tablet 12 are in the natural horizontal resting position (FIG. 3), the Z axis 34 and the center of gravity 36 are aligned with a vertical axis 38 passing through the axis of rotation 22. Accordingly, the gravitational force "g" acts on the mass M along the vertical axis 38 coincident with the Z axis 34. When the user types and applies the force F to the tablet's display 14, the tablet support 20 and the tablet 12 pivot about the axis of rotation 22 so as to tip the tablet 12. This tipping causes the center of gravity 36 to move laterally relative to the vertical axis 38 by a distance "L". Accordingly, the force balance that results in maintaining the tipped tablet is:

$$F \cdot A = M \cdot g \cdot L,$$

wherein:
F=Force
A=distance between Force and the axis of rotation (22)
M=mass of counterweight assembly (40)
g=gravity
L=distance between the center of gravity (36) and the vertical axis (38)

The position of the counterweight 42 also controls how much the tablet 12 and tablet support 20 will tip (i.e., rotate about the axis of rotation 22). A user may find a more ergonomically comfortable orientation of the tablet 12 by tipping the tablet 12 more or less relative to horizontal. Accordingly, if a user wants a greater angular orientation of the tablet relative to horizontal when typing, the user would move the counterweight 42 closer to the tablet 12, so as to decrease the counteracting load applied by the counterweight assembly 40 for the same typing force F applied by the user. The user, however, would also experience a reduced force feedback. Conversely, if the user prefers to have the tablet 12 tipped less (i.e., oriented closer to horizontal), the user could select to have the counterweight 42 further from the tablet 12 to provide a greater counteracting load and greater force feedback.

The counterweight assembly 40 can be a manual assembly wherein the user can manually adjust the counterweight 42 to modify the degree of tip and amount of force feedback when typing or otherwise interacting with the tablet 12. For example, the adjustment mechanism 44 can include an adjustment wheel that a user can manually rotate to move the counterweight 42 within the counterweight assembly 40. Other embodiments could use other configurations for manual adjustments of the counterweight assembly 40.

In an alternate embodiment, the holder assembly 10 can include a controller 50 coupled to the drive motor 48 for automated control and adjustment of the counterweight's position relative support frame 26 and tablet 12, thereby controlling the position of the center of gravity 36. The controller 50 can be configured with or coupled to position sensors 52 that monitor the selected position of the counterweight 42. The controller 50 can also be operatively coupled to the tablet 12 and activatable upon the tablet 12 identifying the user. For example, a tablet 12 may identify multiple users by user names and passwords. The controller 50 and tablet 12 can establish a user preference for each user regarding the preferred angular orientation of the tablet 12 and tablet support 20, and the desired amount of force feedback applied to the user when typing on the tablet 12. For example, the first time a user uses the holder assembly 10 and associated tablet 12, the user can set the counterweight assembly 40 and the associated position of the counterweight 42 for his or her preferred rotational orientation and force feedback. The next time the user uses the holder assembly 10 and is identified (e.g., via the tablet 12), the controller 50 can activate the drive motor 48 and the position sensors 52 to move the counterweight 42 to the proper location in accordance with the user's preference. In one embodiment, the controller 50 can be coupled to an image recognition program or other identification application utilized by the tablet 12 to identify the user. Upon identifying the user and the user's preferences, the controller 50 can adjust the counterweight assembly 40 to rotate the tablet support 20 and associated tablet 12 in accordance with the identified user's preferences.

Figure 5:
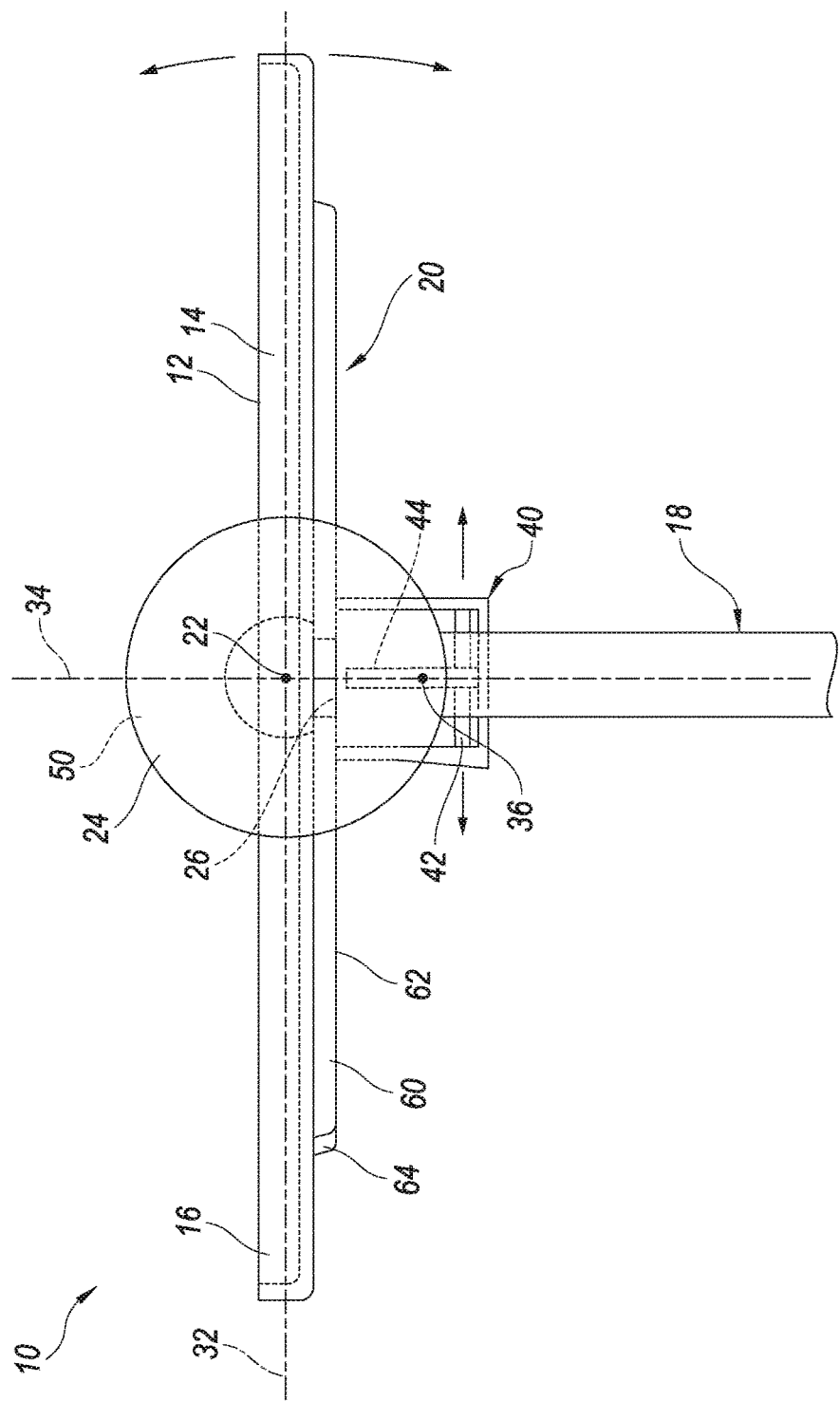
FIG. 5 is a partial side elevation view of a holder assembly in accordance with another embodiment of the present disclosure, with a tablet shown in a horizontal natural resting position.
Figure 6:
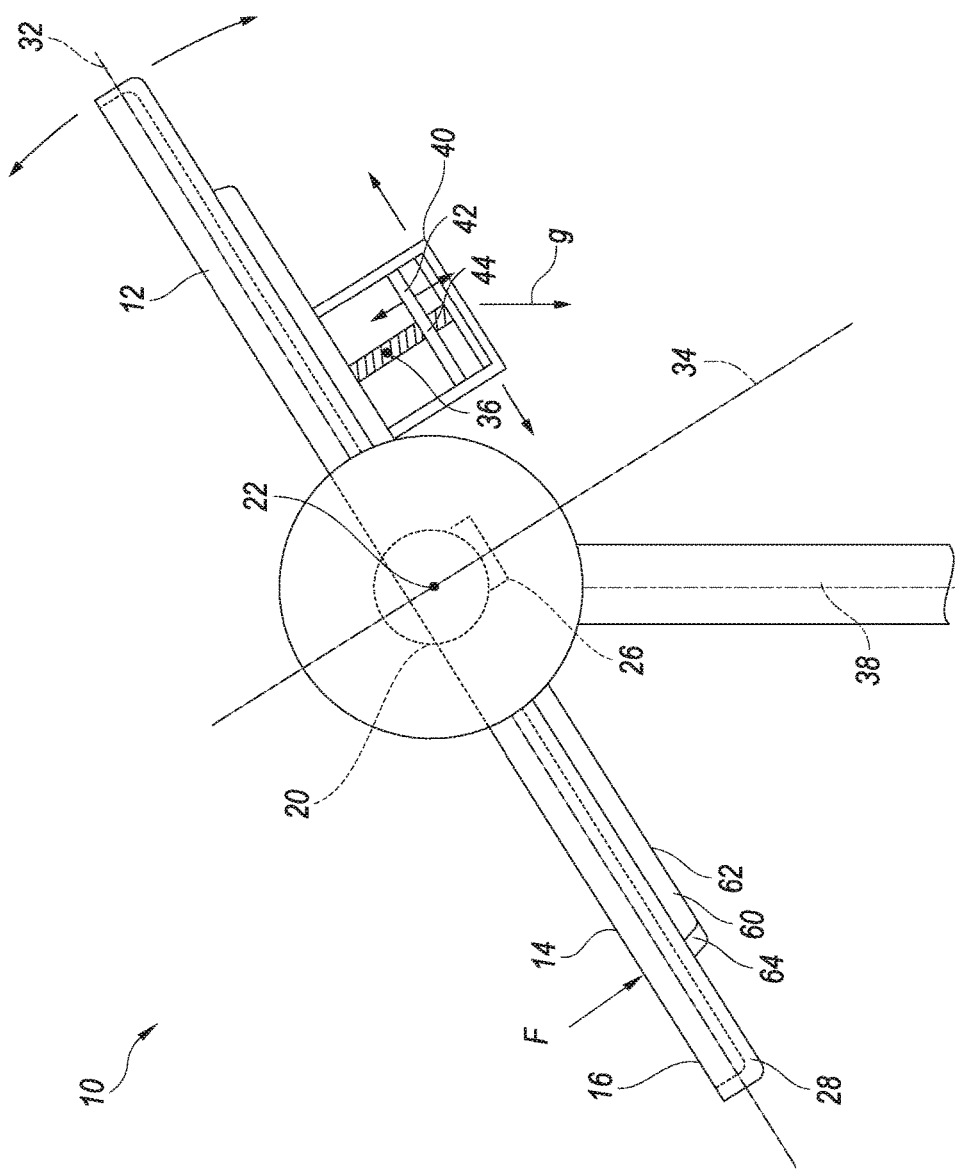
FIG. 6 is a partial side elevation view of the holder assembly of FIG. 5 with the tablet in a tilted, operating position.

The embodiment of FIGS. 2-4 has the counterweight assembly 40 that remains in alignment with the Z axis 34 of the tablet support 20 (i.e., substantially normal to the face of the tablet 12) and coplanar with the axis of rotation 22. In another embodiment illustrated in FIGS. 5 and 6, the tablet support 12 has a lateral support assembly 60 with an adjustment track 62 connected to the support frame 26 and the counterweight assembly 40. The counterweight assembly 40 is movable laterally along the adjustment track 62 in a direction substantially perpendicular to the axis of rotation 22 and parallel to the lateral axis 32. Accordingly, the holder assembly 10 can be adjusted to move the center of gravity 36 laterally by moving the counterweight assembly 40 along the adjustment track 62. The center of gravity 36 can also be moved closer or farther from the support frame 26 via the adjustment mechanism 44 and the counterweight 42 as discussed above. In the illustrated embodiment, the counterweight assembly 40 can be moved manually along the adjustment track 62. In another embodiment, a drive motor 64 can be coupled to the adjustment track 62 to selectively position the counterweight assembly 40 to a desired lateral position.

In operation, the counterweight assembly 40 can be positioned on the lateral support assembly 60 so that the resting position of the tablet support 20 holds the tablet 12 at a selected angle relative to horizontal. For example, the counterweight assembly 40 an be positioned on the adjustment track 62 on one side of the Z axis 34, such that the display 14 and user interface 16 of the tablet 12 will tip toward the user. When the user, however, begins to type on the tablet 12 with the typing force F, the counterweight assembly 40 can be moved along the adjustment track 62 (i.e., to the other side of the Z axis 34) to counteract the typing force F. The counterweight 42 can also be moved along the adjustment mechanism 44 to control the position of the center of gravity 36 to offset the typing force F and to provide the desired force feedback for the user. The use of the lateral support assembly 60 to move the center of gravity 36 relative to the user's typing force also allows the use of a smaller counterweight 42 to achieve the same amount of control and force feedback to a user when typing on the tablet 12.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

I claim:

1. An adjustable holder assembly for use with a computer device having a display with a user interface portion, the holder assembly comprising:
    a mounting structure;
    a display support rotatably coupled to the mounting structure for rotation about a first axis, the display support having a center of gravity and having second and third axes orthogonal to each other and to the first axis, the display support comprises:
        a support structure configured to removably retain the computer device with display substantially parallel to the first and second axes and substantially perpendicular to the third axis, wherein the display support and the computer device are rotatable as a unit about the first axis in response to a user applying a force to the display at a location spaced apart from the axis of rotation; and
    an adjustable counterweight assembly connected to the support structure and having a counterweight and an adjustment mechanism substantially aligned with the third axis and being connected to the counterweight, wherein the adjustment mechanism is adjustable to move the counterweight relative to the support structure to move the center of gravity substantially parallel to the third axis toward or away from the support structure;
    wherein adjusting the counterweight to move the center of gravity toward the support structure decreases a resistance of the display support to rotate about the first axis, and thereby providing a first force feedback to a user pressing on the user interface at a location spaced apart from first axis and in a direction substantially parallel to the third axis, and wherein adjusting the counterweight to move the center of gravity away from the support structure increases the resistance of the display support and the tablet to rotate about the first axis, and thereby providing a second force feedback to the user pressing on the user interface of the display at a location spaced apart from axis of rotation and in a direction substantially parallel to the third axis, wherein the second force feedback is greater than the first force feedback.

2. The adjustable holder assembly of claim 1 wherein the adjustment mechanism is manually adjustable to move the counterweight.

3. The adjustable holder assembly of claim 1, further comprising a drive motor operatively connected to the adjustment mechanism and activatable to move the counterweight relative to the support structure.

4. The adjustable holder assembly of claim 1 wherein the adjustment mechanism is a drive screw.

5. The adjustable holder assembly of claim 1 wherein the support structure further comprises a retention frame configured to releasably receive the computer device and to center the computer device relative to the third axis, wherein the support structure has a natural resting orientation with the first and second axes being substantially horizontal.

6. The adjustable assembly of claim 1, further comprising a controller coupled to the counterweight assembly and configured to activate the adjustment mechanism to move the counterweight to a first position for an identified first user of the computer device, and configured to activate the adjustment mechanism to move the counterweight to a second position different than the first position for a second user.

7. The adjustable assembly of claim 6 wherein the controller is operatively connectable to the computer device and responsive to user identification information to move the counterweight to the first or second positions in response to identification of the respective first or second user.

8. The adjustable assembly of claim 1, further comprising a lateral adjustment assembly connected to the counterweight assembly, wherein the counterweight assembly is movable on the lateral adjustment assembly in a direction parallel to the second axis.

9. The adjustable assembly of claim 8 wherein the adjustment mechanism and the lateral adjustment assembly are manually adjustable to move the counterweight relative to the support structure.

10. The adjustable assembly of claim 8, further comprising a drive system motor operatively connected to at least one of the adjustment mechanism and the lateral adjustment assembly to move the counterweight relative to the support structure.

11. An adjustable holder assembly for use with a computer device having a user interface portion, and having orthogonally oriented first, second and third axes, wherein the first and second axis are substantially parallel to the user interface portion, and the third axis is substantially perpendicular to the user interface portion, the holder assembly comprising:
a mounting structure;
a display support rotatably coupled to the mounting structure for rotation about an axis of rotation, the display support having a center of gravity, the display support comprises:
a support structure connectable to the computer device, wherein the display support and the computer device are rotatable as a unit about the axis of rotation in response to a user pressing against an input portion of the computer device at a location spaced apart from the axis of rotation; and
an adjustable counterweight assembly connected to the support structure and having a counterweight and an adjustment mechanism connected to the counterweight, the counterweight being spaced apart from the axis of rotation, the adjustment mechanism being adjustable to move the counterweight in a direction normal to the axis of rotation to move the center of gravity substantially parallel to the third axis toward or away from the support structure;
wherein the adjustable counterweight is configured to provide a force feedback to a user pressing on the input portion of the computer device, and adjusting the counterweight to move the center of gravity toward the support structure decreases the force feedback, and adjusting the counterweight to move the center of gravity away from the support structure increases the force feedback.

12. The adjustable holder assembly of claim 11, further comprising a controller coupled to the counterweight assembly and configured to activate the adjustment mechanism to move the counterweight to a first position for an identified first user of the computer device, and configured to activate the adjustment mechanism to move the counterweight to a second position different than the first position for a second user.

13. An adjustable holder assembly for use with a computer tablet having a display screen with a user interface portion, and having orthogonally oriented first, second and third axes, wherein the first and second axis are substantially parallel to the display screen, and the third axis is substantially perpendicular to the display screen, the holder assembly comprising:
a mounting structure;
a tablet support rotatably coupled to the mounting structure for rotation about an axis of rotation, the tablet support has a center of gravity and comprises: a support structure configured to removably retain the computer tablet with the first axis substantially coincident with the axis of rotation, wherein the tablet support structure and computer tablet rotate as a unit about the axis of rotation and relative to the mounting structure in response to a user applying a force to the display screen at or adjacent to the user interface portion at a location spaced apart from the axis of rotation; and
an adjustable counterweight assembly connected to the support structure, and having a counterweight and an adjustment mechanism, the adjustment mechanism being substantially aligned with the third axis and being connected to the counterweight, wherein the adjustment mechanism is adjustable to move the counterweight relative to the support structure and move the center of gravity substantially parallel to the third axis toward or away from the support structure;
wherein adjusting the counterweight to move the center of gravity toward the support structure decreases a resistance of the tablet support to rotate about the axis of rotation, and thereby providing a force feedback to a user pressing on the user interface at a location spaced apart from axis of rotation and in a direction substantially parallel to the third axis.

14. The adjustable holder assembly of claim 13 wherein the adjustment mechanism is manually adjustable to move the counterweight.

15. The adjustable holder assembly of claim 13, further comprising a drive motor operatively connected to the adjustment mechanism and activatable to move the counterweight relative to the support structure.

16. The adjustable holder assembly of claim 13 wherein the adjustment mechanism is a drive screw.

17. The adjustable holder assembly of claim 13 wherein the support structure further comprises a retention frame configured to releasably receive the computer tablet and to center the computer tablet relative to the third axis, wherein the support structure has a natural resting orientation with the first and second axes being substantially horizontal.

18. The adjustable assembly of claim 13 wherein the adjustable assembly is configured to support the computer tablet for use by a first user who applies first rotational forces to the user interface during engagement with the user interface, and for use by a second user who applies second rotational forces to the user interface during engagement with the user interface, and the adjustable assembly further comprising a controller coupled to the counterweight assembly and configured to activate the adjustment mechanism to move the counterweight to a first identified position for the first user based on the first rotational forces applied by the first user to the user interface, and configured to activate the adjustment mechanism to move the counter weight to a second identified position for the second user based on the second rotational forces applied by the second user to the user interface.

19. The adjustable assembly of claim 18 wherein the controller is operatively connectable to the tablet and responsive to user identification information to move the counterweight to the first or second identified positions in response to identification of the respective first or second users.

20. The adjustable assembly of claim 13, further comprising a lateral adjustment assembly connected to the counterweight assembly, wherein the counterweight assembly is movable on the lateral adjustment assembly in a direction parallel to the second axis.

* * * * *